United States Patent

[11] 3,624,421

| [72] | Inventors | Richard H. Pantell;<br>Harold E. Puthoff, both of Menlo Park, Calif. |
|---|---|---|
| [21] | Appl. No. | 45,440 |
| [22] | Filed | June 11, 1970 |
| [45] | Patented | Nov. 30, 1971 |
| [73] | Assignee | Research Corporation<br>New York, N.Y.<br>Continuation-in-part of application Ser. No. 619,647, Mar. 1, 1967, now abandoned.<br>This application June 11, 1970, Ser. No. 45,440 |

[54] TUNABLE RAMAN LASER
11 Claims, 6 Drawing Figs.

| [52] | U.S. Cl. | 307/88.3, 321/69 R, 330/4.5, 331/107 R |
|---|---|---|
| [51] | Int. Cl. | H03f 7/00 |
| [50] | Field of Search | 307/88.3; 321/69 |

[56] References Cited
UNITED STATES PATENTS
3,536,931  10/1970  Boyd et al..................... 307/88.3

OTHER REFERENCES
Huth et al., " IEEE Journal of Quantum Electronics," Dec. 1966, pp. 763– 769. 330-4.5
Schaufele et al., " Physical Review," Dec. 9, 1966, pp. 705– 708. 330-4.5

*Primary Examiner*—Roy Lake
*Assistant Examiner*—Darwin R. Hostetter
*Attorney*—Lindenberg, Freilich & Wasserman

ABSTRACT: A continuously tunable laser arrangement consisting of an optical cavity, containing a Raman-type material, which is infrared active. A pump source of intense coherent radiation is employed to excite an idler frequency, which is one of the natural infrared modes of the material. The angle between the cavity axis and the direction of radiation from the pump source is adjustable to control the actual frequency of the excited idler frequency and thereby control the frequency of output radiation representing an output signal.

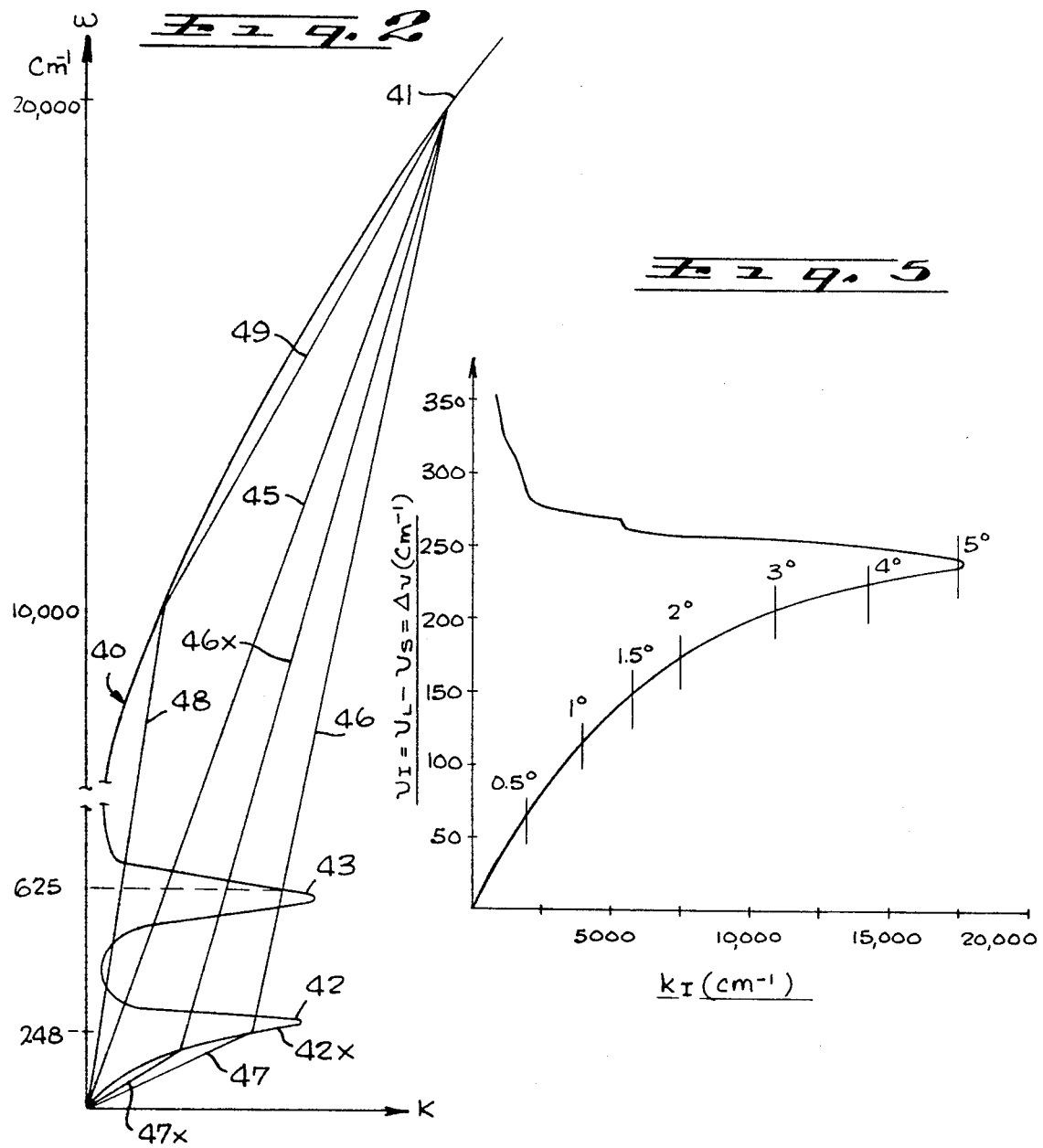
Fig. 2
Fig. 5
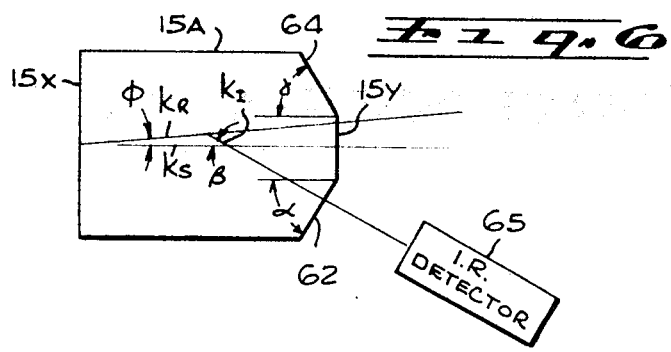
Fig. 6
R. H. PANTELL
H. E. PUTHOFF
INVENTORS

TUNABLE RAMAN LASER

CROSS-REFERENCE TO RELATED APPLICATIONS

This is a continuation in-part of U.S. Pat. application Ser. No. 619,647, filed Mar. 1, 1967, and now abandoned.

BACKGROUND OF THE INVENTION

1. Field of the Invention

This invention generally relates to a tunable oscillator and, more particularly, to a continuously tunable optical oscillator.

2. Description of the Prior Art

The term "lasser" has been extensively used to describe a quantum electronic device which generates coherent electromagnetic radiation in the infrared and visible or optical frequency regions. Most presently known lasers are of the type in which the laser can only be fixedly tuned to provide coherent radiation of a unique frequency within the infrared or visible region. Such a limitation is quite disadvantageous where it is desired to produce coherent radiation in any one of a plurality of frequencies within a limited frequency range.

OBJECTS AND SUMMARY OF THE INVENTION

It is a primary object of the present invention to provide a new improved source of coherent electromagnetic radiation.

Another object is to provide a new laser arrangement which is tunable to provide coherent electromagnetic radiation in any one of a plurality of frequencies.

A further object of the invention is the provision of a laser arrangement which is tunable to provide electromagnetic radiation in the infrared region.

Still a further object is to provide a laser arrangement which is continuously tunable by means of a relatively simple arrangement in order to provide light at a frequency tunable over a selected range.

These and other objects of the invention are achieved by providing a device which consists of an optical cavity, containing an infrared and Raman active material, in which natural vibrations also referred to as an idler frequency in the infrared region is excited by radiation from an intense coherent optical source, hereafter simply referred to as the pump. These vibrations when mixed with the radiation from the pump produce, by means of a nonlinear Raman effect, an output signal whose frequency is a function of the pump and idler frequencies. The angle between the pump axis and the cavity axis along which the output radiation is produced may be varied continuously, thereby enabling the continuous tuning of the frequency of the output radiation, after sufficient cumulative radiation reinforcement along the cavity axis takes place.

The novel features that are considered characteristic of this invention are set forth with particularity in the appended claims. The invention will best be understood from the following description when read in connection with the accompanying drawings.

BRIEF DESCRIPTION OF THE DRAWINGS

FIG. 2 is a curve of dispersion characteristics of the type of infrared and Raman active crystal employed in the present invention;

FIG. 3 is a diagram of another embodiment of the invention;

FIGS. 4 and 5 are diagrams useful in explaining the novel features and the operation of the invention; and FIG. 6 is a side view of a crystal in still another embodiment of the invention.

DESCRIPTION OF THE PREFERRED EMBODIMENTS

Figure 1:
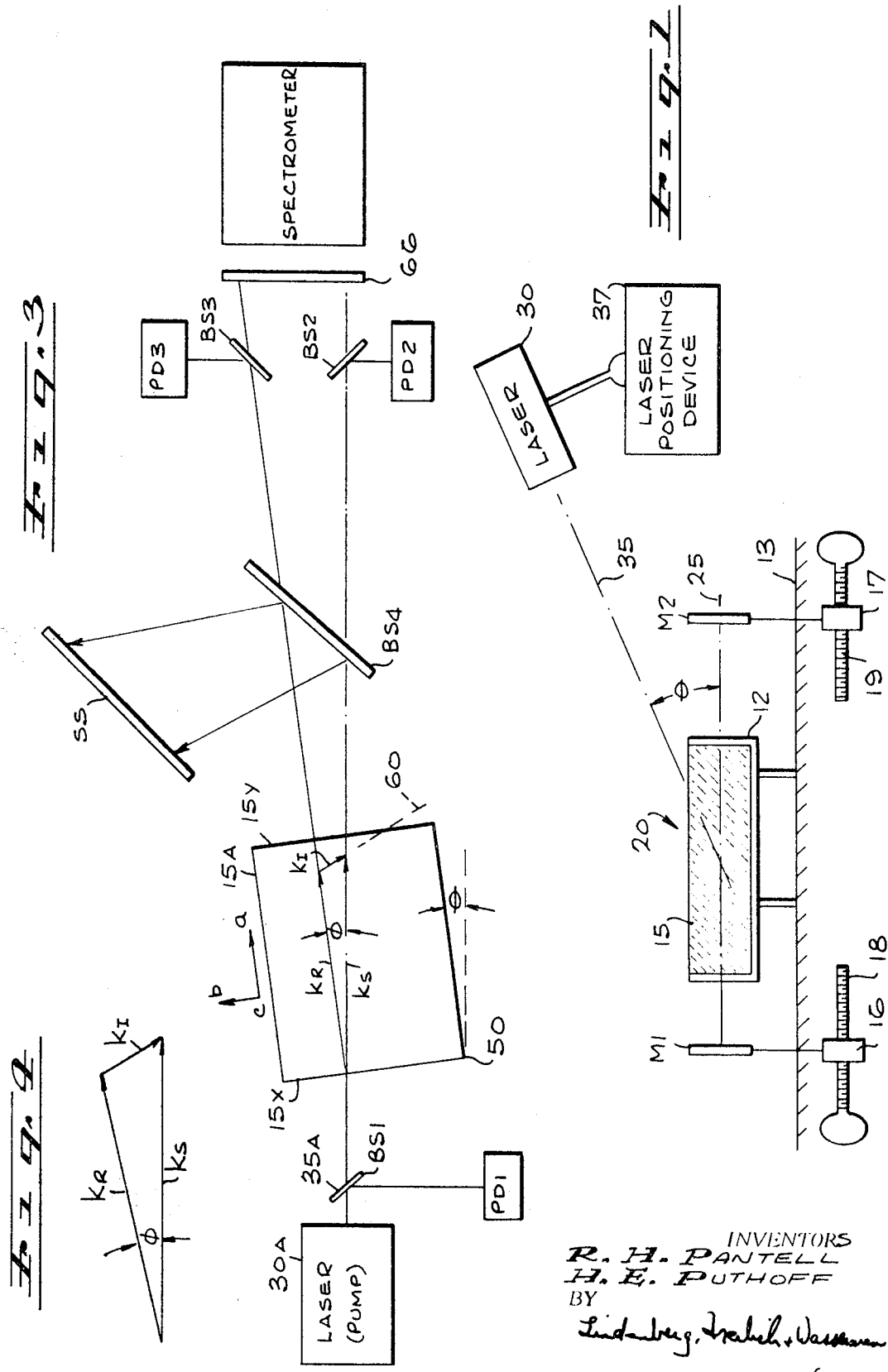
FIG. 1 is a combination cross-sectional and side view of one embodiment of the invention.

Referring to FIG. 1 in one embodiment of the invention, a container 12 is provided, which is fixedly supported on a structure 13. The container is constructed of a material which is transparent to infrared radiation. Such a material may be potassium bromide (KBr). Therein is contained a crystal 15, which is both Raman and infrared active, i.e., one which is infrared absorbing. Crystals having these properties are well known. One example of such a crystal is lithium niobate (LiNbO$_3$). Clearly, if desired the container 12 may be eliminated since element 15 is a crystal.

A pair of mirrors, designated M1 and M2 are positioned on opposite side of the crystal 15. The relative positions of mirrors M1 and M2 with respect to one another and the crystal are controllably adjustable by any conventional means. For example, the respective mirrors may be supported on traveling nuts 16, 17 which are mounted on lead screws 18 and 19, respectively. The spacing between the two mirrors M1 and M2 within which the Raman-type crystal is placed, may be considered as defining an optical cavity 20. The cavity is tunable by controlling the spacing between M1 and M2 and their coatings, so that the cavity is broadly resonant at a selected beat frequency or Stokes line in the Raman spectrum which is excited in the crystal 15, as will be explained hereafter. In the drawing, line 25 represents a longitudinal axis of the cavity 20, which hereafter is referred to as the cavity axis.

In addition to the structure already described, the present invention includes an intense coherent optical source 30, such as a fixedly tuned laser 30 which directs optical radiation to the crystal 15. In the particular arrangement source 30 represents a pump which supplies the crystal 15 with the exciting radiation. The axis of the radiation from the laser or pump to the Raman crystal, hereafter also referred to as the pump beam or axis, is represented by line 35, which forms an angle $\theta$ with the cavity axis 25. The position of pump 30 is made adjustable to enable the angle $\theta$ to be controllably varied. This is accomplished by supporting the pump by any well-known tripod device which permits angular adjustments. This device is represented in the drawing by a rectangle 37 labeled "Laser Positioning Device." As will be pointed out hereafter, the angle $\theta$ may also be controlled by fixedly supporting the pump 30 and by rotating the crystal 15.

By adjusting the position of pump 30, the angular relationship ($\theta$) between the pump beam or axis (line 35) and the cavity axis (line 25) is made variable, thereby controlling the frequency of the output radiation or output signal derived from this invention. One or both of the mirrors M1, M2 may be made less than 100 percent reflective to enable some of the light to pass therethrough. Output radiation of the output signal emerges in strength from one or both mirrors after cumulative reinforcement along the cavity axis 25.

The frequency tuning technique, achieved by varying $\theta$, is based on the recognition that the vibrations from which Raman scattering takes place have dispersion characteristics which indicate that the frequency of vibrations depends on the wave vector of the vibrational wave. By controlling the vibrational wave vector in the interaction the vibrational frequency is controlled, thereby controlling the optical sum and difference frequencies generated by the mixing process, which is inherent in the stimulated Raman effect. Alternately stated, in an infrared and Raman active crystal, in which an idler wave in the infrared region is excited by exciting the crystal with the pump frequency, the output signal frequency is a function of the pump frequency and the idler frequency. By varying or tuning the idler frequency, the output signal frequency is varied or tuned.

Let the frequency and wave vector of the output signal radiation from the mirrors, which hereafter may also be referred to as the Stokes radiation, be designated by $w_R$ and $k_R$, respectively. Constrained by geometry and conservation principles $w_R$ and $k_R$ are related to the frequency and wave vector of the radiation from pump 30, designated $w_S$ and $k_S$, respectively, and to the frequency and wave vector of the vibrational waves or idler which are designated by $w_V$ and $k_V$ respectively. For the first Stokes difference frequency the relationships may be expressed as:

$$w_R = w_S - w_V \quad \text{and}$$
$$k_R = k_S - k_V.$$

For the foregoing relationships, it is assumed that $w_V$ and $k_V$ satisfy, in addition, the dispersion characteristic for the idler or vibrational waves in the crystal 15 and $w_S$, $k_S$ and $w_R$, $k_R$ satisfy the dispersion characteristics for the electromagnetic wave in the crystal from the source, i.e., the pump radiation, and output signal radiation, respectively. Also, $k_S$ and $k_R$ are assumed to be colinear with the radiation axis or direction 35 and the cavity axis 25. Thus, the output signal frequency is determined by the angular relationship $\theta$ between the direction of radiation from source 30 and the cavity axis 25. Control of the angle $\theta$ is provided by unit 37.

In practice, the cavity 20 may be tuned, by adjusting the mirror coatings and positions of M1 and M2, to be broadly resonant at a Stokes line, which represents the output signal. Thereafter, the angle $\theta$ is adjusted to control the exact frequency of the output signal in the broadened frequency range of the selected Stokes line.

The basic principles underlying the operation of the present invention may best be summarized in conjunction with FIG. 2 which is one example of a curve of the dispersion characteristics of a Raman and infrared active crystal, such as lithium niobate. The curve 40 is plotted as a function of wave vector $k$ vs. angular frequency $\omega$, designated in terms of wave number. The dispersion curve 40 is shown having a portion 41, assumed to be in the visible and near infrared regions and two portions 42 and 43 which represents two modes in the infrared region. These curve portions represent two of the excitable infrared modes of the Raman and infrared active crystal. The wave numbers of these two modes are 625 cm.$^{-1}$ and 248 cm.$^{-1}$. The radiation from pump 30 is represented vectorially by arrow 45, while arrows 46 and 47 represent the dispersion vectors of the output signal radiation and the infrared mode which is naturally excited in the crystal, as the idler. Therein, it is assumed that the excited infrared mode is the 248 cm.$^{-1}$ mode which is represented by the curve portion 42.

Based on the conservation principles, herebefore discussed, it should be apparent from FIG. 2 that the tuning of the output signal radiation is due to the tuning of the idler frequency in the infrared region. In practice, the change in the angle $\theta$ actually changes the idler frequency and, therefore, the frequency of the output signal radiation. It is the dispersion characteristics of the crystal about its excited infrared mode which accounts for the ability to tune the infrared idler frequency which is excited, by controlling the angle $\theta$. In practice, it is the curved portion 42x of curve portion 42 which accounts for the tuning capability. It should be appreciated that the change in $\theta$ results in a change in the infrared idler frequency which is excited, which in turn controls the frequency of the output signal radiation.

Herebefore, the invention has been described as a laser for tuning the output radiation which is assumed to be in the visible range. However, since such a capability is accomplished due to the ability to tune the idler frequency in the infrared region, the invention can be regarded as a laser capable of tuning infrared radiation, when the tuned idler radiation, rather than the visible radiation, serves as the output.

In the present invention, by selecting an infrared and Raman active crystal the radiation from pump 30 excites one of the infrared modes of the crystal 15. Assuming LiNbO$_3$ is chosen for crystal 15 its 248 cm.$^{-1}$ mode may be excited. In FIG. 2 this mode is represented by curve portion 42. By varying the angle $\theta$ within a selected range, the actual idler frequency in the infrared region is varied, as represented by the dispersion vectors 47 and 47x. In such an arrangement the idler infrared frequency is tunable from about 250$\mu$ to 40$\mu$, resulting in a change of about 200$\mu$ in the output signal frequency. It should further be stressed that in the present invention due to the conservation principle, expressed as $w_R = w_S - w_V$, assuming $w_S$ is in the visible region, since $w_V$ is in the deep infrared region, the output signal frequency $w_R$ is also in the visible region. For example, assuming that $w_S$=6943 A for a ruby laser, which expressed in wave numbers is 14400 cm.$^{-1}$, the output signal frequency $w_R$ may be varied from 14,400−40 =14,360 cm.$^{-1}$ to 14,400−250=14,200 cm.$^{-1}$. Thus, the ratio of the frequencies of the output signal and the idler is very large.

It should be stressed that such an arrangement is patentably distinguishable from a parametric oscillation system in which tuning of an output frequency is achieved by crystal rotation In such a parametric system the tuning is controlled by the optical refractive index Since the percentage change of the refractive index, due to crystal rotation is small, all three waves are practically in the same optical region. Also, the output signal and idler frequencies are nearly equal and are about one-half the pump frequency. The pump and idler output signal in such a parametric system are designated in FIG. 2 by arrows 45, 48 and 49 respectively.

These characteristics of a parametric system, in which crystal orientation is used for tuning purposes, are discussed in "Quantum Electronics," by Amnon Yariv Library of Congress Catalog Cord Number 67-19452, particular attention being directed to pages 366–368. As stated therein, in the parametric system the deviations from collinearity of wave vectors $k_1$, $k_2$ and $k_3$ are small. Thus, the idler and output signal frequencies are nearly equal to one another and are half the pump frequency. As stated therein, with a pump wavelength of 0.529$\mu$, the signal and idler wavelengths are around 1$\mu$.

It should again be stressed that in the parametric system it is the change in the refractive index of the material which produces and controls the frequencies of the idler and output signal. Since the maximum percent change of the refractive index is small, all three waves are in the visible and near infrared regions. Unlike such an arrangement, in the present invention it is the material's resonance characteristics which control the system's operation. Herein, an infrared mode of the crystal is excited which is not dependent on the optical refractive index. By controlling the angle $\theta$ the frequency of the excited idler in the infrared region is controlled, thereby controlling the output signal frequency. In the present invention the output frequency is in the range of the pump frequency, which is in or near the visible region, and which is many fold greater than the idler frequency which is in the infrared region.

In the foregoing example of the invention it has been assumed that the angle $\theta$ is adjusted by adjusting the position of pump 30. Clearly, if desired, the pump 30 may be stationary and crystal 15 may be rotated to control the angle $\theta$. Also, herebefore, it has been assumed that the optical cavity is adjusted by controlling the spacing between mirrors M1 and M2. In practice, since the output signal frequency is in or near the visible region, i.e., its wavelength is extremely short. Consequently, the spacing between mirrors M1 and M2 is not critical, since regardless of the spacing or distance therebetween, for all practical purposes this distance represents an integer number of wavelengths. In practice the mirrors may be replaced by polishing opposite faces of the crystal flat and parallel to one another, to provide for multiple reflections of the output signal or Stokes radiation inside the crystal.

An embodiment incorporating a crystal with flat parallel faces is diagrammed in FIG. 3, wherein elements like those previously described are designated by like numerals, followed by the suffix A. The crystal 15A is assumed to have two opposite polished flat and parallel faces 15x and 15y, which define the optical cavity. In this particular arrangement the laser or pump 30A is assumed to be fixedly supported and the crystal 15A is assumed to be rotatable about an axis 50, which is perpendicular to the plane of the paper, in order to define the angle $\theta$ between the pump and cavity axes. In FIG. 3, arrows $k_S$, $k_R$ and $k_I$ represent the wave vectors of the pump, output signal and the idler radiations. The angle $\Phi$ represents the separation angle between the pump and Stokes beams inside the crystal. The angle $\Phi$ is dependent on the externally controlled angle $\theta$. As diagrammed in FIG. 4 and as is appreciated from wave vector conservation, assumed herein, the angle $\Phi$ controls the wave vectors and, therefore, the frequencies of the idler and the Stokes or output signal radiations. Thus, by controlling angle $\theta$, angle $\Phi$ is controlled which in turn controls the idler and output signal frequencies.

In one particular embodiment, actually reduced to practice, stimulated tunable optical radiation was obtained by using the dispersion characteristic of $LiNbO_3$ in the vicinity of $A_1$ symmetry 248 cm.$^{-1}$ polariton mode. The dispersion curve of $LiNbO_3$ in the vicinity of the $A_1$ symmetry 248 cm.$^{-1}$ polariton mode is diagrammed in FIG. 5. The short vertical lines designate different values of the angle $\Phi$, between the pump and Stokes radiation in the crystal. In this particular embodiment it was discovered that with $\theta=0$, $\Phi$ was 0.42°, producing an idler wave number of about 50 cm.$^{-1}$ (200 $\mu$). Then, as $\theta$ was increased from 0° to about 15°, the angle $\Phi$ increased to about 5°. Idler tunability was present until $\Phi$ reached 5°, where the idler wave number was 248 cm.$^{-1}$ (40$\mu$). The wave number remained constant at the polariton mode peak value as $\Phi$ was increased from 5° to 90°.

In the particular embodiment which was reduced to practice both the pump and Stokes radiations remained polarized parallel to the C axis, shown in FIG. 3. Beam splitters BS1, BS2 and BS3 were used to partially reflect the input pump radiation, the output pump radiation and the Stokes radiation to photodetectors PD1-PD3 respectively, for monitoring purposes. Wavelength was determined by directing the output pump radiation and the Stokes radiation to a spectrometer, through a ground glass screen GG, which provided uniform illumination at the spectrometers spectrometer input slit. The different values of $\Phi$ were determined by determining the spatial separation of the output pump radiation and the Stokes radiation on a screen SS to which they were reflected by a beam splitter BS4.

It should be appreciated that in the present invention by varying $\theta$ and thereby causing $\Phi$ to vary over a given range both the idler frequency in the infrared region and the Stokes frequency in the visible region are tuned or varied. Clearly, if desired the tunable infrared idler, which is naturally excited in the crystal due to its infrared active characteristic, may be used as the output signal instead of the Stokes beam or frequency. In such a case the invention can be thought of as a tunable infrared laser.

The excited mode or idler infrared radiation may be detected by positioning an infrared detector in a direction which coincides or is aligned with the direction of the wave vector of the idler in the crystal. This direction is represented in FIG. 3 by dashed line 60. Preferably, to minimize reflection loss at the crystal-air interface, the crystal is cut to define a face which is perpendicular to the direction defined by line 60.

It should be appreciated that in the present invention the direction of the idler wave vector is not fixed. Indeed it varies over a small range as the angle $\Phi$ varies as a function of the changes in angle $\theta$. However, an average direction may be assumed for a chosen range of change of $\Phi$. If desired more than one additional face may be defined in the crystal for two assumed different average directions of the idler's wave vector for two different ranges of $\Phi$.

As previously pointed out in $LiNbO_3$ in which the 248 cm.$^{-1}$ mode is excited it has been discovered that when the idler wavelength varies from about 50$\mu$ to 238$\mu$ as $\theta$ is varied, the angle $\Phi$ varies from about 0.42° to 5°. Thus, two faces may be cut in the crystal for two idler wave vector directions for two different values of $\Phi$, such as $\Phi=1°$ and for $\Phi=2.5°$. Such an arrangement is shown in FIG. 6 wherein the two faces are designated by numerals 62 and 64 and an infrared detector is designated by numeral 65. Assuming that face 62 is optimized of $\Phi$ in the range of 0.42° to 1.5°, when $\theta$ is varied so that $\Phi$ is between 1.5° and 5°, the crystal 15x may be rotated 180° so that face 64 is perpendicular to the idler wave vector direction 60.

The actual angle that face 62 makes with the normal to face 15y, designated by $\alpha$, may be determined by determining $\beta$ for $k_I$ when $\Phi=1°$. $k_I$ can be calculated for $\Phi=1°$ from the expression, $$k_I^2 = k_S^2 + k_R^2 - 2k_S k_R \cos \Phi$$

$$= 4\pi^2(\nu_S \eta_S - \nu_R \eta_R)^2 + 8\pi^2 \nu_S \eta_S \nu_R \eta_R (1-\cos \Phi),$$

wherein $\nu_S$, $\nu_R$ are the laser and Stokes wave numbers in cm.$^{-1}$ and $\eta_S$ and $\eta_R$ are the corresponding refractive indices. Once $k_I$ is calculated, the angle $\beta$ can be determined from the expression, $$k_R^2 = k_S^2 + k_I^2 - 2k_S k_I \cos \beta,$$

wherein all the terms, but $\beta$ are known.

The same procedure may be followed to determine the angle $\gamma$ between face 64 and the normal to face 15y by determining the value of $\beta$ for $\Phi=2.5°$.

It should be stressed that the various values of frequencies, wave numbers and angles, herebefore discussed, where presented for explanatory purposes only. The actual values clearly depend on the particular crystal which is used, the infrared mode which is excited therein and the dispersion characteristics about the excitable mode. The invention may be summarized as comprising a system in which radiation from a pump is directed to a cavity-defining infrared and Raman active crystal. By controlling the angular relationship between the cavity axis and the pump axis, the frequency of the excited infrared idler or mode of the crystal is controllable over a range which depends on the mode's dispersion characteristics. Due to conservation principles, the change in frequency of the excited idler accounts for a change in frequency of the Stokes radiation, produced by the interaction of the pump and idler radiations in the crystal.

Although particular embodiments of the invention have been described and illustrated herein, it is recognized that modifications and variations may readily occur to those skilled in the art and consequently it is intended that the claims be interpreted to cover such modifications and equivalents.

What is claimed is:

1. An optical system comprising:
   a source for providing coherent electromagnetic radiation at a fixed frequency;
   single optical cavity means defining a cavity axis and comprising an infrared and Raman active crystal to which said radiation from said source is directed, said crystal being characterized by having at least one natural infrared mode which is excitable therein when the radiation from said source is directed thereto, with the interaction between said source radiation and said excited infrared mode producing a Stokes radiation at a frequency which is a function of the frequencies of said source radiation and said excited infrared mode; and
   means for controlling the angular relationship between said cavity axis and the direction of radiation from said source to control the frequencies of said excited infrared mode and said Stokes radiation.

2. The arrangement as recited in claim 1 wherein the frequencies of said source radiation and said Stokes radiation are substantially in the same region of the optical spectrum and the frequency of said excited infrared mode is substantially equal to the difference between the frequencies of said source and Stokes radiation.

3. The arrangement as recited in claim 1 wherein the wavelength of said excited infrared mode is not less than 10 microns and the wavelength difference between said source and Stokes radiations is not less than 10 microns.

4. The arrangement as recited in claim 3 wherein said crystal is lithium niobate.

5. The arrangement as recited in claim 1 wherein said means for controlling control the angle, definable as $\theta$, between said cavity axis and the source radiation direction, whereby the wavelength of said excited infrared mode decreases from a first value to a maximum value as said angle $\theta$ is increased from a first angular value toward a second angular value which is a function of the dispersion characteristics of said crystal in the region of said excitable mode.

6. The arrangement as recited in claim 5 wherein said crystal defines first and second opposite faces with said cavity axis extending therebetween, and further defining at least a third face at an angle with respect to said first face, the angle between said first and third faces being a function of the direction of the wave vector in said crystal of the infrared mode excited therein when said angle $\theta$ is of a preselected value.

7. The arrangement as recited in claim 5 wherein said crystal has first and second opposite polished flat faces which are parallel to one another and perpendicular with respect to said cavity axis, with said faces defining the ends of said optical cavity.

8. The arrangement as recited in claim 7 wherein said crystal is lithium niobate and said excitable mode is the $A_1$ symmetry 248 cm.$^{-1}$ mode, with the wavelength of said excitable mode varying over a range of over 150 microns as said angle $\theta$ is varied over several degrees.

9. The arrangement as recited in claim 8 wherein said source of radiation is a Q-switched ruby laser and the wavelength of said excited mode varies from substantially 50 microns to substantially 240 microns as $\theta$ varies from substantially 0 degrees to 15°.

10. The arrangement as recited in claim 7 wherein said crystal further defines at least a third face at an angle with respect to said first face, the angle between said first and third faces being a function of the direction of the wave vector in said crystal of the direction of the wave vector in said crystal of the infrared mode excited therein when said angle $\theta$ is of a preselected value.

11. The arrangement as recited in claim 10 wherein said crystal is lithium niobate and said excitable mode is the $A_1$ symmetry 248 cm$^{-1}$ mode, with the wavelength of said excitable mode varying over a range of over 150 microns as said angle $\theta$ is varied over several degrees above zero.

* * * * *